Patented Jan. 5, 1943

2,307,010

UNITED STATES PATENT OFFICE 2,307,010

TRIMETHYL - HYDROQUINONE CONDENSATION PRODUCT AND PROCESS FOR THE MANUFACTURE OF SAME

John A. Aeschlimann, Riehen, near Basel, Switzerland, assignor to Hoffmann-La Roche Inc., Nutley, N. J., a corporation of New Jersey No Drawing. Application January 26, 1940, Serial No. 315,854. In Switzerland February 16, 1939

5 Claims. (Cl. 260—479)

It is known that trimethyl-hydroquinone can be condensed with phytol or with phytyl-halides or phytadiene to dl-α-tocopherol.

It has now been found that a hitherto unknown condensation product can be obtained if trimethyl-hydroquinone is condensed with acetyl-phytol. The resulting condensation product can be transformed into a crystalline compound by acetylation.

The intermediate condensation product is a paste of the consistency of soft soap which is soluble in petroleum-ether. It reduces potassium-permanganate in the cold, and gold-chloride in the heat. The acetyl derivative, obtained therefrom by treatment with acetic anhydride, distils at 220° C. at a pressure of 0.08 mm.; after recrystallisation from methyl-alcohol it shows a melting point of 60° C. The iodine value is 48.9 (calculated 49.4). It is not capable of reducing permanganate or alcoholic silver-nitrate in the cold. Its formula is:

of trimethyl-hydroquinone in 200 parts by weight of benzene and 40 parts by weight of anhydrous zinc-chloride, dissolved in 450 parts by weight of dry ether, while stirring at 40° C. The product is gently heated under reflux for another 4 hours, then treated with water, and the benzene-ether layer successively washed with water, dilute hydrochloric acid, a dilute solution of caustic soda, and several times with water. After drying with sodium-sulphate, the solvents are distilled off. The residue consists of a soapy paste. The product is dissolved in warm petroleum-ether, whereby the condensation product precipitates as a flocculent deposit on cooling. The solution is centrifuged, the petroleum-ether decanted, and the residue dried in vacuo. 190 parts by weight of a paste of the consistency of soft soap are obtained.

By acetylation with 1½ parts by weight of acetic anhydride at 140–160° C. an oil distilling at 220° C./0.08 mm. is obtained which can be

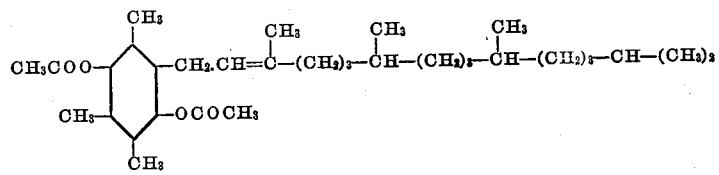

By hydrolysis with methyl alcoholic sulphuric acid an oil is obtained therefrom which reduces gold-chloride, forms duro-hydroquinone by thermal decomposition and is identical with dl-α-tocopherol.

The condensation product is to be employed for the manufacture of medicinal preparations having the action of vitamin E, and as an intermediate in the preparation of further pharmaceutically important compounds.

Example

In the course of one hour, 185 parts by weight of acetyl-phytol in 200 parts by weight of benzene are added to a mixture of 74 parts by weight recrystallised from 3 parts by weight of methyl-alcohol. White crystals of melting point 60° C. are obtained. The substance has the empirical formula: $C_{33}H_{54}O_4$ of a diacetyl derivative of $(HO)_2C_6(CH_3)_3.C_{20}H_{39}$. C=76.8, H=10.3. Iodine value=48.9. $CH_3CO$=16.6%. Calculated: C=77.0, H=10.5. Iodine value=49.4. $CH_3CO$=16.7%.

I claim:

1. An acetylated trimethyl-phytyl-hydroquinone of the formula

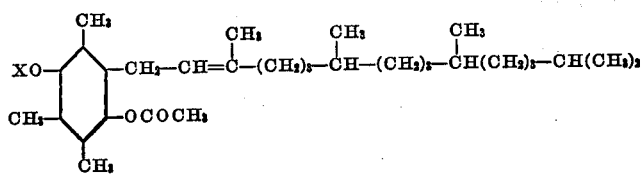

wherein X is selected from the group consisting of hydrogen and acetyl radicals.

2. An acetylated trimethyl-phytyl-hydroquinone of the formula

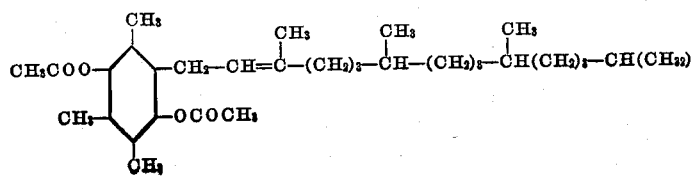

3. An acetylated trimethyl-phytyl-hydroquinone of the formula

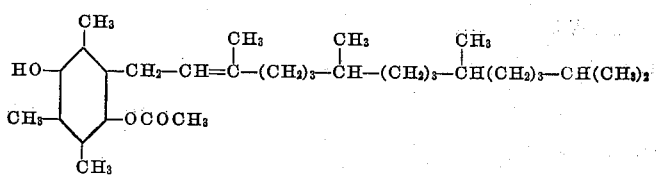

4. Process for the manufacture of a trimethyl-hydroquinone condensation product, consisting of reacting trimethyl-hydroquinone with acetyl-phytol in presence of zinc chloride and acetylating the intermediate product with acetic anhydride.

5. 2,5,6-trimethyl-3-phytyl-benzohydroquinone diacetate.

JOHN A. AESCHLIMANN.